June 4, 1929.  E. C. McKENZIE-MARTYN  1,715,854

FLUID TIGHT JOINT

Filed March 6, 1923

INVENTOR
Edward C. McKenzie-Martyn
BY
O. G. Messenger
ATTORNEY

Patented June 4, 1929.

1,715,854

UNITED STATES PATENT OFFICE.

EDWARD C. McKENZIE-MARTYN, OF SHORT HILLS, NEW JERSEY, ASSIGNOR TO STANDARD DEVELOPMENT COMPANY, A CORPORATION OF DELAWARE.

FLUID-TIGHT JOINT.

Application filed March 6, 1923. Serial No. 623,102.

This invention relates to fluid-tight joints and will be fully understood from the following description taken in connection with the accompanying drawing, in which—

Figure 1:
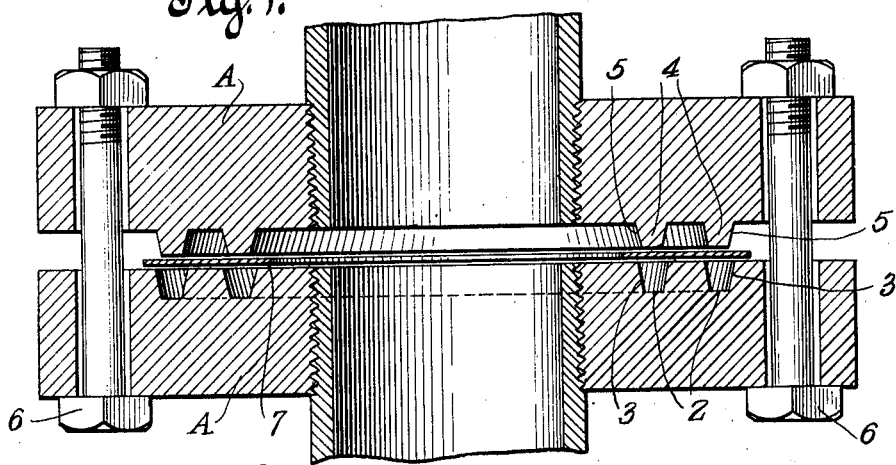
Fig. 1 is a longitudinal section through a joint embodying a form of construction contemplated in the invention, the parts being slightly separated for clearness.

Referring to the drawing, the reference character A designates elements which are to be joined in a leak-proof manner, such as pipe sections, man-heads, etc. In the abutting faces these are provided with offset surfaces which present an obstructive break or change in the planar face, and which if desired may also coact to give a wedging or lateral crowding action as the members are drawn together. In Fig. 1, one of the members is provided with grooves 2. It will be understood that one or more of these may be employed as desired, two being shown for illustration. The side walls of the grooves may be straight or normal to the face of the member, but it is preferable that at least one wall or better both be somewhat inclined or sloping, as illustrated at 3 in Fig. 1. The other member is provided with projecting ridges 4. These may have their lateral walls 5 inclined at the same angles as the walls of the grooves, or if desired they may be inclined at differing angles. The latter is preferable in fact, as it results in a wedging or lateral binding action when the members are drawn together by the bolts 6 or other clamping means employed. While ordinarily no additional packing is necessary, the engagement of the projecting ridges and the grooves being sufficient to present escape of fluid at the joint, where desired packing can also be used. In this case, I contemplate the employment of rings 7 or other suitable pieces of ductile metal, as iron, copper, aluminum, etc. These may be flat or if desired they may be preliminarily more or less shaped up or grooved. On the members being drawn up against such rings the crowding surfaces tend to bed into or indent the soft metal, and insure tight joints against very high pressure.

Figure 2:
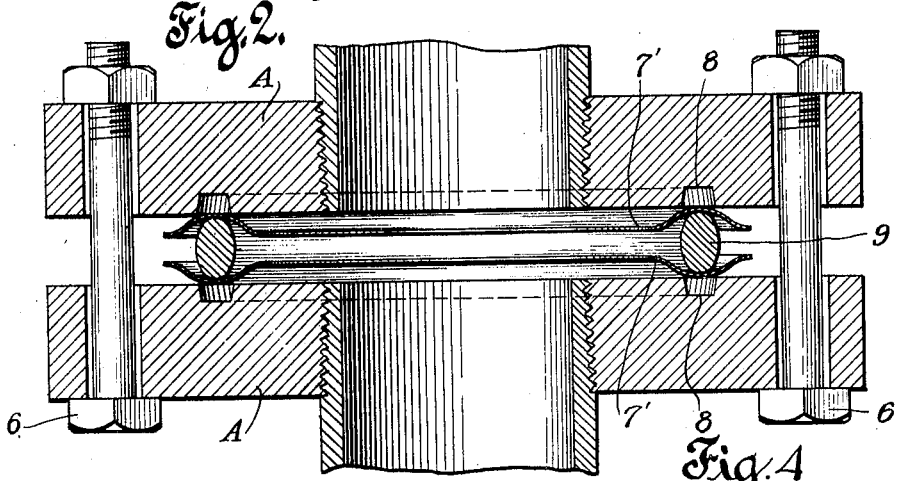
Fig. 2 is a similar view of a modified form.

In the form shown in Fig. 2, the opposing faces of both members are provided with cooperating grooves 8. These grooves may have straight lateral walls, or they may slope or taper on one or both walls as desired. Arranged to engage in the cooperating grooves when the members are brought together is an abutment ring or member 9. This may vary in its surface contour, but advantageously so as to bed against the walls when the assemblage is drawn tight by the bolts 6 or other clamping means used. If desired additionally, one or two packing rings 7' may be used between the abutment member 9 and the grooves. Such rings may be flat when introduced, or if preferred may be initially shaped up or grooved.

Figure 3:
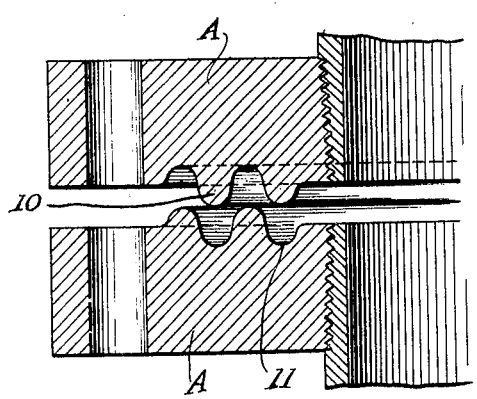
Fig. 3 is a sectional detail of another modification.
Figure 4:
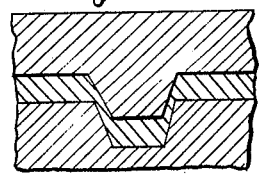
Fig. 4 is an enlarged vertical section showing one preferred cooperative relation of the ridge and groove walls.

In Fig. 3, alternating ridges and grooves are formed correspondingly in the faces of both members. In sectional contour, these ridges and grooves are laid out on curves and preferably of such relative dimensions as to bind on the side walls when drawn together. If desired, a packing ring can additionally be used.

What I claim is:

1. A joint comprising opposed members, a ridge on one of said members, a groove on the other of said members and adapted to receive the ridge, a side of the ridge having an inclination differing from the inclination of a side of the groove and a sheet of ductile metal interposed between the members and overlying the groove, whereby upon drawing the members together the ductile metal is forced into the groove and is wedged therein by the ridge.

2. A joint comprising opposed members, a ridge on one of said members, a groove on the other of said members and adapted to receive the ridge, the sides of the ridge having an inclination differing from the inclination of the sides of the groove, means for forcibly drawing the ridge and groove into proximity, and ductile metal packing wedged between and intended by the side walls of the ridge and the groove.

EDWARD C. McKENZIE-MARTYN.

CERTIFICATE OF CORRECTION.

Patent No. 1,715,854.                                Granted June 4, 1929, to

EDWARD C. McKENZIE-MARTYN.

It is hereby certified that the assignee in the above numbered patent was erroneously described and specified as "Standard Development Company, a Corporation of Delaware", whereas said assignee should have been described and specified as Standard Oil Development Company, a Corporation of Delaware", as shown by the records of assignments in this office; and that the said Letters Patent should be read with this correction therein that the same may conform to the record of the case in the Patent Office.

Signed and sealed this 2nd day of July, A. D. 1929.

(Seal)                                                        M. J. Moore,
                                                                Acting Commissioner of Patents.